(12) United States Patent
Muromachi et al.

(10) Patent No.: US 8,367,187 B2
(45) Date of Patent: Feb. 5, 2013

(54) VEHICLE WINDOW PANE AND MANUFACTURING METHOD THEREFOR

(75) Inventors: Takashi Muromachi, Tokyo (JP); Nobuki Iwai, Tokyo (JP); Hisashi Ogawa, Tokyo (JP); Mamoru Yoshida, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 736 days.

(21) Appl. No.: 12/087,139

(22) PCT Filed: Dec. 21, 2006

(86) PCT No.: PCT/JP2006/326173
§ 371 (c)(1),
(2), (4) Date: Jun. 26, 2008

(87) PCT Pub. No.: WO2007/077905
PCT Pub. Date: Jul. 12, 2007

(65) Prior Publication Data
US 2009/0007490 A1    Jan. 8, 2009

(30) Foreign Application Priority Data

Dec. 28, 2005    (JP) .................................. 2005-379705

(51) Int. Cl.
*B32B 3/00* (2006.01)
*B32B 23/02* (2006.01)
*B32B 17/06* (2006.01)

(52) U.S. Cl. ......... 428/156; 428/172; 428/192; 428/426

(58) Field of Classification Search .................. 428/156, 428/172, 192, 426, 428, 432, 141, 143, 145, 428/148, 323, 329, 330, 689, 702; 427/256, 427/287

See application file for complete search history.

(56) References Cited

U.S. PATENT DOCUMENTS
(Continued)

FOREIGN PATENT DOCUMENTS

| EP | 1 477 465 A1 | 11/2004 |
|----|-------------|---------|
| EP | 1 541 536 A1 | 6/2005 |

(Continued)

OTHER PUBLICATIONS

European Search Report dated Nov. 26, 2009 issued in counterpart European Application No. 06843553.6.

(Continued)

*Primary Examiner* — Catherine A Simone
(74) *Attorney, Agent, or Firm* — Holtz, Holtz, Goodman & Chick, PC (57) ABSTRACT

A window pane for an automobile includes a single sheet of glass plate and an infrared cutoff film formed on the single sheet of glass plate. A film thickness of the infrared cutoff film on an upper portion of the window pane is greater than the film thickness on a lower portion of the window pane when the window pane is installed in the automobile. A variation from a minimum value in the film thickness on the lower portion to a maximum value in the film thickness on the upper portion is at least 1000 nm per 600 mm in a vertical direction of the window pane when installed in the automobile. The infrared cutoff film is formed on a surface of the single sheet of glass plate by using a flow coating method.

9 Claims, 5 Drawing Sheets

U.S. PATENT DOCUMENTS

| | | | |
|---|---|---|---|
| 6,416,890 B1 | 7/2002 | Terneu et al. | |
| 6,636,370 B2 * | 10/2003 | Freeman | 359/894 |
| 6,673,456 B1 * | 1/2004 | Kobata et al. | 428/437 |
| 2004/0071957 A1 | 4/2004 | Fujita | |
| 2005/0003210 A1 | 1/2005 | Inoguchi et al. | |
| 2005/0164014 A1 | 7/2005 | Tomonaga et al. | |
| 2006/0210776 A1* | 9/2006 | Lu et al. | 428/192 |
| 2007/0036985 A1 | 2/2007 | Kamitani et al. | |
| 2007/0224340 A1* | 9/2007 | Hatta et al. | 427/160 |
| 2009/0080066 A1 | 3/2009 | Muromachi et al. | |

FOREIGN PATENT DOCUMENTS

| | | |
|---|---|---|
| EP | 1 736 453 A1 | 12/2006 |
| EP | 1 967 500 A1 | 9/2008 |
| EP | 1 975 133 A1 | 10/2008 |
| JP | 03-080132 A | 4/1991 |
| JP | 06-115348 A | 4/1994 |
| JP | 07-070481 A | 3/1995 |
| JP | 7-157749 A | 6/1995 |
| JP | 07-157749 A | 6/1995 |
| JP | 08-179101 A | 7/1996 |
| JP | 09-030836 A | 2/1997 |
| JP | 10-087349 A | 4/1998 |
| JP | 11-335141 A | 12/1999 |
| JP | 2001-354447 A | 12/2001 |
| JP | 2004-162020 A | 6/2004 |
| JP | 2004-338985 A | 12/2004 |
| JP | 2005-022941 A | 1/2005 |
| RU | 94045904 A1 | 5/1996 |
| RU | 94033485 A1 | 7/1996 |
| RU | 32039 U1 | 9/2003 |
| RU | 2 233 812 C2 | 8/2004 |
| WO | WO 2004/011381 A1 | 2/2004 |
| WO | WO 2005/095298 A1 | 10/2005 |
| WO | WO 2005118503 A1 * | 12/2005 |

OTHER PUBLICATIONS

U.S. Appl. No. 12/087,758, filed Jul. 14, 2008, entitled: "Vehicle Window Glass and Manufacturing Method Therefor," Inventor: T. Muromachi et al.

International Preliminary Report on Patentability, Chapter I of the Patent Cooperation Treaty,and Written Opinion for PCT/JP2006/ 326173 dated Jul. 10, 2008. 7 sheets.

Russian Office Action dated Nov. 18, 2010 (and English translation thereof) in counterpart Russian Application No. 2008130874/03 (038329).

Chinese Office Action dated Jan. 20, 2011 (and English translation thereof) in counterpart Chinese Application No. 200680049054.0.

Russian Office Action dated Jan. 28, 2011 (and English translation Application No. 2008133625/03(042330), which is a Russian counterpart of related U.S. Appl. No. 12/087,758.

* cited by examiner

VEHICLE WINDOW PANE AND MANUFACTURING METHOD THEREFOR

This application is a U.S. National Phase Application under 35 USC 371 of International Application PCT/JP2006/326173 filed Dec. 21, 2006.

TECHNICAL FIELD

The present invention relates to a vehicle window pane and a manufacturing method therefor, and more particularly, to a vehicle window pane having a function of cutting off (shielding) infrared rays or the like and a manufacturing method therefor.

BACKGROUND ART

In recent years, there is a technology for mixing an expensive, rare metal, such as indium, in a thin film formed on the surface of a glass plate to provide a function of cutting off (shielding) infrared rays (for example, see the pamphlet of PCT International Patent Publication No. 2004/011381 and the pamphlet of PCT International Patent Publication No. 2005/095298).

As to the infrared shielding glass described in the pamphlet of PCT International Patent Publication No. 2004/011381, use of fluorine component-containing ITO powder having excellent heat resistance allows a sol-gel method to be performed even at high temperatures of 350° C. or higher. The fluorine component with the ITO particles insulated from heat is introduced into an infrared cutoff film.

In the infrared shielding glass described in the pamphlet of PCT International Patent Publication No. 2005/095298, an infrared cutoff film is formed on at least one of the surfaces thereof. The infrared cutoff film is an organic-inorganic composite film obtained by compositing an organic substance and an inorganic oxide, in which ITO fine particles are contained as an infrared cutoff component.

Figure 6:
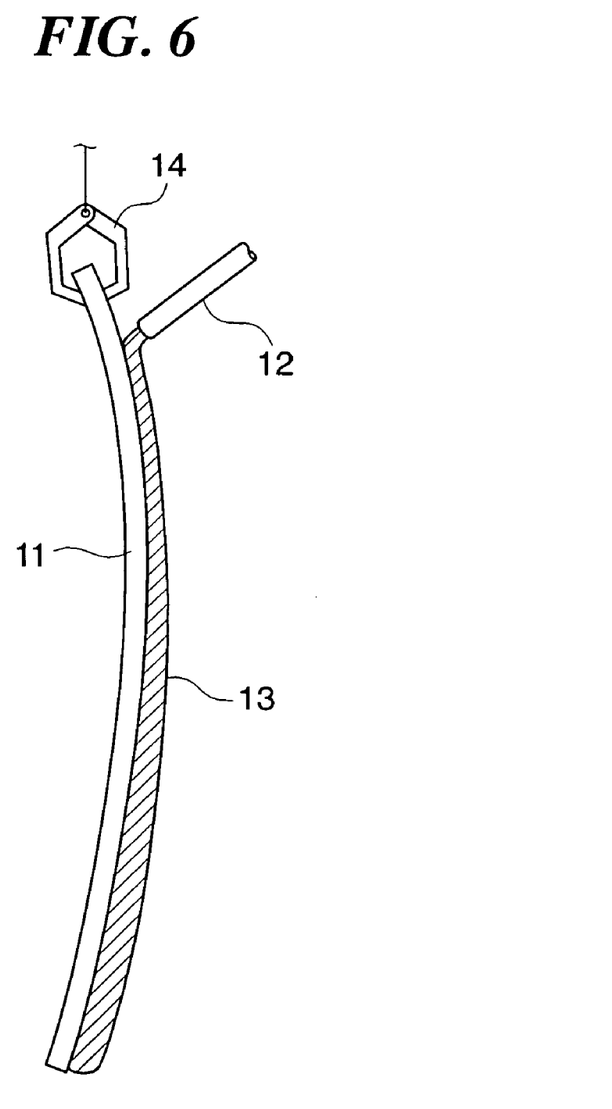
FIG. 6 is a view used to explain a conventional manufacturing method for infrared shielding glass.

As a method for forming a thin film, such as an infrared cutoff film, on the surface of a glass plate, flow coating method has been known. In the flow coating method, as shown in FIG. 6, with a glass plate 11 held by a glass plate holding member 14 in the vertical direction, a nozzle 12 is used to eject infrared cutoff liquid 13 onto the upper portion of the glass plate 11. The infrared cutoff liquid 13 ejected onto the upper portion of the glass plate 11 flows vertically downward, and is applied onto the glass plate 11 (see Japanese Laid-Open Patent Publication (Kokai) No. 7-157749).

Figure 7:
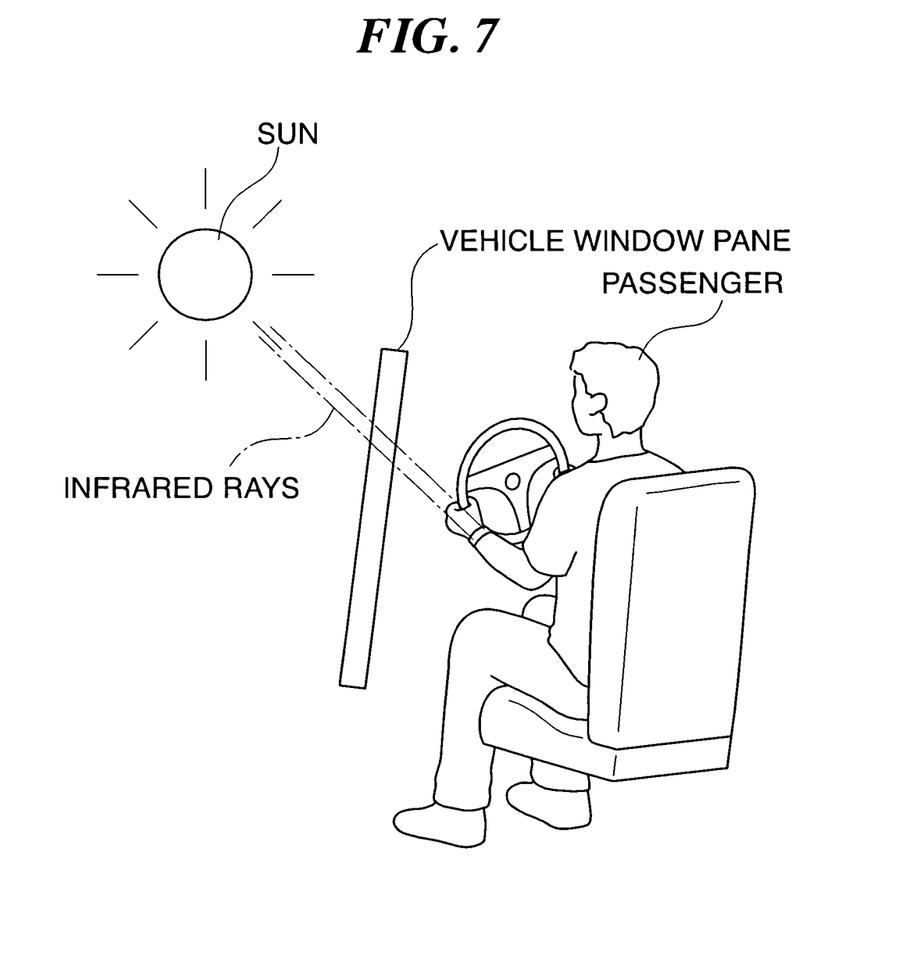
FIG. 7 is a view used to explain that infrared rays pass through the upper portion of a conventional vehicle window pane.

In the flow coating method shown in FIG. 6, however, the infrared cutoff liquid 13 ejected onto the upper portion of the glass plate 11 flows vertically downward and is applied onto the glass plate 11, so that the film thickness of the infrared cutoff film on the upper portion of the glass plate 11 is smaller than the film thickness of the infrared cutoff film on the lower portion of the glass plate 11. As a result, the infrared cutoff effect of the upper portion of the glass plate 11 is weaker than the infrared cutoff effect of the lower portion of the glass plate 11. When the glass plate 11 is installed in a vehicle in such a way that the upper portion of the glass plate 11, where the infrared cutoff effect is weaker, is located on the upper side of the vehicle window pane, a large amount of infrared rays, especially light having a wavelength of 1550 nm, enter the vehicle as shown in FIG. 7, which causes burning sensation of the skin of a passenger in the vehicle.

Increasing the amount of ejection of the infrared cutoff liquid 13 to increase the film thickness of the whole infrared cutoff film so as to enhance the infrared cutoff effect disadvantageously increases the cost of manufacturing the infrared shielding glass.

It is an object of the present invention to provide a vehicle window pane that can be manufactured at low cost and can reduce burning sensation of the skin of a passenger in the vehicle, and a manufacturing method therefor.

DISCLOSURE OF THE INVENTION

To achieve the above object, in a first aspect of the present invention, there is provided a vehicle window pane having an infrared cutoff film formed thereon and installed in the vehicle characterized in that the film thickness of the infrared cutoff film on the upper side of the vehicle is greater than the film thickness of the infrared cutoff film on the lower side of the vehicle.

As described above, since the film thickness of the infrared cutoff film on the upper side of the vehicle is greater than the film thickness of the infrared cutoff film on the lower side of the vehicle, the infrared cutoff effect of the upper portion of the vehicle, where direct infrared rays likely impinge on a passenger, can be enhanced, so that the manufacturing cost can be reduced and burning sensation of the skin of the passenger in the vehicle can be reduced.

According to the present aspect, the infrared cutoff film preferably contains a silica component and an infrared cutoff component.

As described above, since the infrared cutoff film contains a silica component and an infrared cutoff component, the durability of the infrared cutoff film can be enhanced.

According to the present aspect, the infrared cutoff component is preferably at least one of fine particles selected from the group consisting of tin-doped indium oxide (ITO) fine particles, antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, lanthanum hexaboride fine particles, and cerium hexaboride fine particles.

Thus, since the infrared cutoff component is at least one of fine particles selected from the group consisting of tin-doped indium oxide (ITO) fine particles, antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, lanthanum hexaboride fine particles, and cerium hexaboride fine particles, the infrared shielding function can be reliably provided.

According to the present aspect of the present invention, the content of the infrared cutoff component is preferably 20 to 45 mass % of the total mass of the infrared cutoff film.

As described above, since the content of the infrared cutoff component is 20 to 45 mass % of the total mass of the infrared cutoff film, the infrared shielding function can be reliably provided and the durability of the infrared cutoff film can be enhanced.

According to the present aspect, the film thickness preferably continuously varies from the upper side of the vehicle to the lower side of the vehicle.

As described above, since the film thickness continuously varies from the upper side of the vehicle to the lower side of the vehicle, there is no bump thickness of the infrared cutoff film and hence the abrasion resistance can be enhanced.

According to the present aspect, the difference between the greatest film thickness of the infrared cutoff film on the upper side of the vehicle and the smallest film thickness of the infrared cutoff film on the lower side of the vehicle is preferably 1000 nm or greater.

According to the present aspect, the greatest film thickness of the infrared cutoff film on the upper side of the vehicle is preferably equal to or greater than twice the smallest film thickness of the infrared cutoff film on the lower side of the vehicle.

According to the present aspect, the infrared cutoff glass on the lower side of the vehicle where the film thickness is the smallest preferably has an optical transmittance of 30% or lower for light with wavelengths of 1000 to 1600 nm and an optical transmittance of 20% or lower for light with wavelengths of 1600 to 2500 nm, and the infrared cutoff glass on the upper side of the vehicle where the film thickness is the greatest preferably has an optical transmittance of 20% or lower for light with wavelengths of 1000 to 1600 nm and an optical transmittance of 10% or lower for light with wavelengths of 1600 to 2500 nm.

According to the present aspect, the 1550-nm wavelength light transmittance of the infrared cutoff glass on the upper side of the vehicle where the film thickness is the greatest is preferably equal to or smaller than 50% of the 1550-nm wavelength light transmittance of the infrared cutoff glass on the lower side of the vehicle where the film thickness is the smallest.

To achieve the above object, in a second aspect of the present invention, there is provided a manufacturing method for a vehicle window pane having an infrared cutoff film formed thereon and installed in the vehicle, the method being characterized by comprising the steps of forming the infrared cutoff film on the surface of a glass plate by using flow coating method, and installing the glass plate, on which the infrared cutoff film has been formed, in the vehicle in such a way that the film thickness of the infrared cutoff film on the upper side of the vehicle is greater than the film thickness of the infrared cutoff film on the lower side of the vehicle.

As described above, since flow coating method is used to form an infrared cutoff film on the surface of a glass plate and the glass plate on which the infrared cutoff film has been formed is installed in the vehicle in such a way that the film thickness of the infrared cutoff film on the upper side of the vehicle is greater than the film thickness of the infrared cutoff film on the lower side of the vehicle, the manufacturing cost can be reduced and burning sensation of the skin of a passenger in the vehicle can be reduced.

BEST MODE FOR CARRYING OUT THE INVENTION

The present inventor carried out assiduous studies to achieve the object, and as a result, discovered that in a vehicle window pane having an infrared cutoff film formed thereon and installed in the vehicle, if the film thickness of the infrared cutoff film on the upper side of the vehicle is greater than the film thickness of the infrared cutoff film on the lower side of the vehicle, the infrared cutoff effect of the upper portion of the vehicle where direct infrared rays likely impinge on a passenger can be enhanced, so that the manufacturing cost can be reduced and burning sensation of the skin of the passenger in the vehicle can be reduced.

The present invention has been made based on the result of the studies described above.

Embodiments of the present invention will be described below in detail with reference to the drawings.

Figure 1:
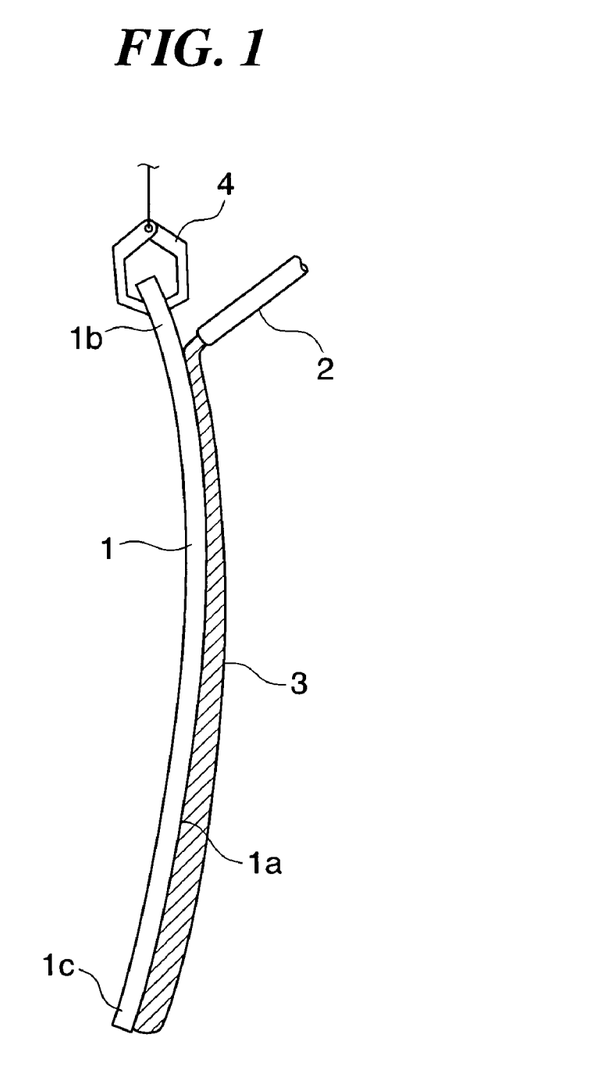
FIG. 1 is a view used to explain a manufacturing method for a vehicle window pane according to an embodiment of the present invention.

FIG. 1 is a view used to explain a manufacturing method for a vehicle window pane according to an embodiment of the present invention.

In FIG. 1, a coating apparatus includes a glass plate holding member 4 that holds a glass plate 1 and a nozzle 2 that ejects an infrared cutoff liquid 3 onto a coating surface 1a of the glass plate 1.

The infrared cutoff liquid 3 is primarily made of a silica component and the like, the constituent unit of which is silica ($SiO_2$), and also contains an organic substance, tin-doped indium oxide (ITO) fine particles (Indium (In)-Tin (Sn) Oxide) as an infrared cutoff component, an inorganic substance, and alcohol, such as ethanol, as a solvent.

The infrared cutoff component is not limited to tin-doped indium oxide (ITO) fine particles, but may be any of antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, lanthanum hexaboride fine particles, and cerium hexaboride fine particles.

The content of the infrared cutoff component in the infrared cutoff film is 20 to 45% of the total mass of the infrared cutoff film.

The silica component and the organic substance form a matrix in the infrared cutoff film formed on the coating surface 1a.

A sol-gel method is used to form a film containing the ITO fine particles dispersed in the matrix containing the silica component and the organic substance. The ITO fine particles dispersed in the matrix are immobilized by using the sol-gel method to solidify the matrix in the sol state. The content of the ITO fine particles immobilized in the matrix is 20 to 45 mass % of the total mass of the infrared cutoff film. When the content of the ITO fine particles is lower than 20 mass % of the total mass of the infrared cutoff film, the infrared shielding function of cutting off infrared rays decreases, whereas when the content of the ITO fine particles is higher than 45 mass % of the total mass of the infrared cutoff film, the hardness of the matrix decreases.

The particle diameter of the ITO fine particle is smaller than or equal to 100 nm, preferably smaller than or equal to 40 nm, more preferably 1 to 40 nm. By setting the particle size within the above range, the efficiency of cutting off infrared rays can be high and generation of haze resulting from a large particle size of the fine particles can be suppressed.

As the organic substance in the infrared cutoff film is used hydrophilic organic polymer, such as polyalkylene oxide or thermal decomposition product of the polyalkylene oxide. Such an organic substance is composited with an inorganic oxide containing a silica component, such as silicon alkoxide, thus formed into a matrix. That is, the matrix is an organic-inorganic composite film made of an organic-inorganic composite compound in which the organic substance and the inorganic oxide are coupled or combined at the molecular level.

The content of the organic substance is 2 to 60% of the total mass of the infrared cutoff film. When the content of the organic substance is lower than 2 mass % of the total mass of the infrared cutoff film, the shrinkage relaxation effect is not exhibited in a sufficient manner and hence the possibility of cracking increases when a thick film is formed. On the other hand, when the content of the organic substance is higher than 60 mass % of the total mass of the infrared cutoff film, the content of the organic substance in the infrared cutoff film is too high to exhibit sufficient hardness.

The content of the silica component in the infrared cutoff film is 20 to 78% of the total mass of the infrared cutoff film, preferably 40 to 78%. When the content of the silica component is lower than 20 mass % of the total mass of the infrared cutoff film, the haze value of the infrared cutoff glass, which is measured after an abrasion resistance test (Taber abrasion test) is performed on the surface on which the infrared cutoff film is formed, cannot be lowered. The concentration of the silica component in the starting material of the matrix added to a solution used in the sol-gel method is 20 to 40 mass %.

The concentration (mass %) of the silica component is determined by calculating the content of the silica, which is the constituent unit of the silica component. For example, even when the organic substance and the silica (silicon oxide) form amorphous material as a composite compound, the mass percentage of the silica component is determined by calculating the content of silica.

In the manufacturing technique, desired properties of the infrared cutoff glass can be obtained through baking at a temperature lower than not only the temperature at which the heat insulation function and the infrared shielding function of the ITO fine particles can be maintained but also the decomposition temperature of the functional materials, for example, 200° C. In this way, it is possible to provide infrared cutoff glass in which thermally unstable ITO fine particles and other functional materials are introduced, with the capabilities thereof intact, into the infrared cutoff film.

With the glass plate 1 held by the glass plate holding member 4 in the vertical direction, the nozzle 2 is used to eject the infrared cutoff liquid 3 onto the upper portion 1b of the glass plate 1. The infrared cutoff liquid 3 ejected onto the upper portion 1b of the glass plate 1 flows vertically downward, and is applied onto the glass plate 1. In this way, the film thickness on the lower portion 1c of the glass plate 1 is greater than that on the upper portion 1b of the glass plate 1.

The glass plate 1 to which the infrared cutoff liquid 3 has been applied is dried for approximately five minutes at room temperature. Then, the glass plate 1 to which the infrared cutoff liquid 3 has been applied is placed in an oven preheated to 200° C., heated for ten minutes, and then cooled. The glass plate 1 having the infrared cutoff film thereon is thus formed.

Figure 2:
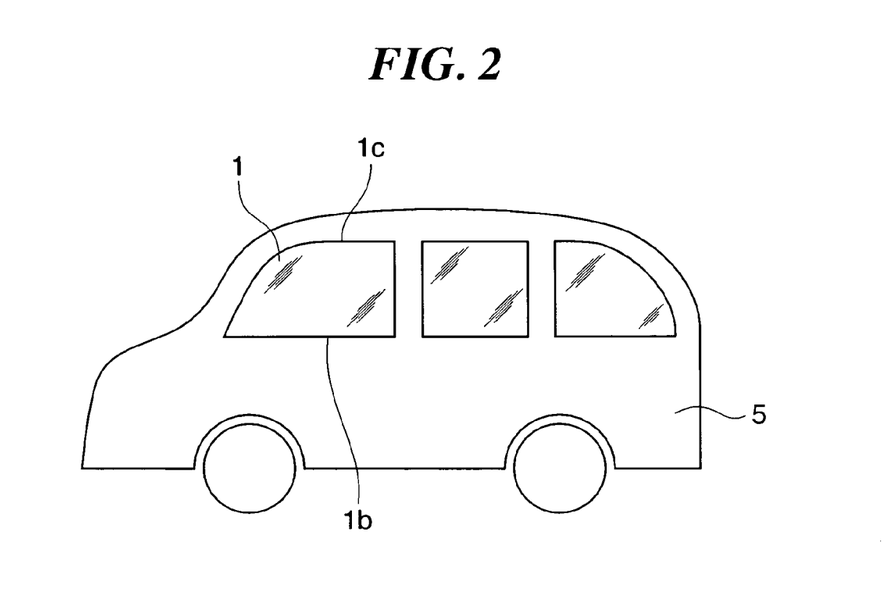
FIG. 2 is a view used to explain how to install the glass plate in FIG. 1 in a vehicle.

FIG. 2 is a view used to explain how to install the glass plate 1 of FIG. 1 in a vehicle.

In FIG. 2, light passing through the glass plate 1 on the upper side of the vehicle 5 likely impinges directly on passenger (FIG. 7).

The glass plate 1 having the infrared cutoff film thereon obtained by using the manufacturing method described above is installed in the vehicle 5 in such a way that the lower portion 1c of the glass plate 1 is located on the upper side of the vehicle 5 and the upper portion 1b of the glass plate 1 is located on the lower side of the vehicle 5. In this way, infrared rays that likely impinge directly on passenger can be efficiently shielded.

EXAMPLES

Examples of the present invention will be described below.

A solution was prepared by mixing polyethylene glycol (PEG400: KANTO CHEMICAL Co., Inc.), pure water, polyether phosphate ester-based surfactant (Solsperse 41000: Lubrizol Japan Ltd.) as a macromolecular dispersant, and denatured alcohol (SOLMIX (registered trademark) AP-7: Japan Alcohol Trading Co., Ltd. (hereinafter referred to as "AP-7")) in this order and stirring the mixture for one minute. Then, AP-7 to which 1 mass % of concentrated hydrochloric acid (KANTO CHEMICAL Co., Inc.) was added (hereinafter referred to as "1 mass % AP-7") was added to the above solution, and the mixture was then stirred for one minute.

Then, tetraethoxysilane (KBE-04: Shin-Etsu Chemical Co., Ltd., content of silica component: 28.8 mass %) was added to the above solution, and the mixture was stirred for four hours at room temperature. Then, ITO particles and ethanol at a mass ratio of 2:3 were mixed, and stirred for four hours, which obtained ITO dispersant. The resultant ITO dispersant was added to the above solution, and the mixture was stirred for 30 minutes. An infrared cutoff liquid 3 was thus obtained. Table 1 shows the amount of each of the liquids placing into the infrared cutoff liquid 3. Fine particles having diameters ranging from approximately 10 to 20 nm were used as the ITO fine particles in the ITO dispersant.

TABLE 1

| Polyethylene glycol | Water | Macromolecular dispersant | Denatured alcohol | 1 mass % AP-7 | Tetraethoxy silane | (Unit: g) ITO dispersant |
| --- | --- | --- | --- | --- | --- | --- |
| 0.036 | 5.86 | 0.162 | 12.44 | 3.00 | 6.25 | 2.25 |

As the glass plate 1, a 4 mm-thick soda-lime-silica glass substrate (green glass having a function of absorbing ultraviolet rays) was cut into an automobile side pane, polished, curved reinforced, and cleaned.

Flow coating was used to apply the infrared cutoff liquid 3 onto the surface of the glass plate 1 under the environment of relative humidity of 30% RH and the temperature of 20° C.

In this process, in the example 1, the infrared cutoff liquid 3 was applied onto the glass plate 1 held by the glass plate holding member 4 in such a way that the lower portion of the glass plate 1 when installed in the vehicle 5 was up. In the comparative example 1, the infrared cutoff liquid 3 was applied onto the glass plate 1 held by the glass plate holding member 4 in such a way that the upper portion of the glass plate 1 when installed in the vehicle 5 was up.

The glass plates 1 to which the infrared cutoff liquids 3 were applied were dried for approximately five minutes at room temperature. Then, the glass plates 1 to which the infrared cutoff liquids 3 were applied were placed in an oven preheated to 200° C., heated for ten minutes, and then cooled. Infrared cutoff glass plates were thus obtained. For the resultant infrared cutoff glass, the content of the ITO fine particles in the infrared cutoff film (hereinafter referred to as "ITO content"), the content of the organic substance in the infrared cutoff film (hereinafter referred to as "organic substance content"), and the content of the silica component in the infrared cutoff film (hereinafter referred to as "silica content") were calculated based on the mass of each of the material components added to the infrared cutoff liquids. Table 2 shows the calculation results. The calculation was based on the mass of the ITO fine particles being 40 mass % of the ITO dispersant, the mass of the organic substance being the total mass of the macromolecular dispersant and the polyethylene glycol, and the mass of the silica component being the content of the silica component in the tetraethoxysilane, which was 28.8 mass %.

TABLE 2

| ITO content (mass %) | Organic substance content (mass %) | Silica content (mass %) |
|---|---|---|
| 31 | 7 | 62 |

Figure 3:
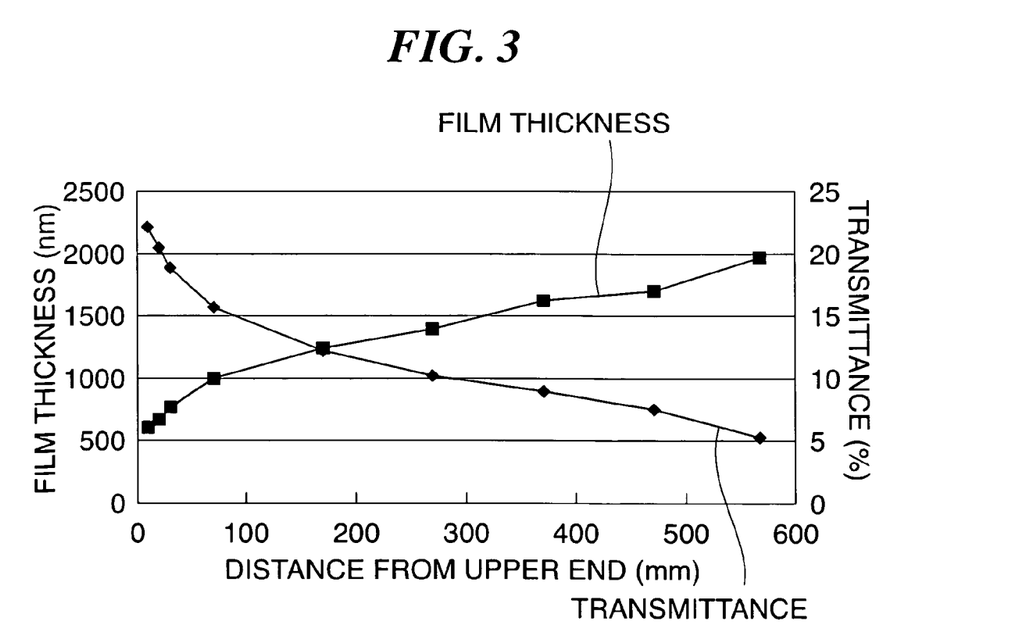
FIG. 3 is a view showing the film thickness of an infrared cutoff film formed on the surface of the glass plate in FIG. 1 and the optical transmittance of the glass plate on which the infrared cutoff film is formed at a wavelength of 1550 nm.

The glass plate 1 of the example 1 was broken into pieces, and a cross-section of the infrared cutoff film formed on the surface of one of the pieces was observed with a field emission scanning electron microscope (SEM) (Model S-4700: Hitachi Ltd.). The observation result was used to determine the film thickness of the infrared cutoff film. Before the measurement, a Pt—Pd film was coated on the specimen (piece) to be measured to make it conductive. The acceleration voltage was set to 5 kV as the measurement condition. The optical transmittance of the glass plate 1 on which the infrared cutoff film was formed at a wavelength of 1550 nm was measured with a spectrophotometer (Model: UV-3100PC: Shimadzu Corporation). FIG. 3 shows the measurement results.

In FIG. 3, the vertical axis on the left represents the film thickness (nm) of the infrared cutoff film formed on the surface of the glass plate 1, and the vertical axis on the right represents the optical transmittance of the glass plate 1 on which the infrared cutoff film is formed at a wavelength of 1550 nm.

The horizontal axis represents the distance (mm) from the upper end of the glass plate 1 on which the infrared cutoff film is formed according to the example 1. The left side of the figure (distance: 0 mm) represents the upper portion 1b of the glass plate 1, and the right side (distance: 600 mm) represents the lower portion 1c of the glass plate 1.

The film thickness of the infrared cutoff film continuously varies from the upper side of the vehicle 5 to the lower side of the vehicle 5. The difference between the smallest film thickness of the infrared cutoff film on the upper portion 1b of the glass plate 1 and the greatest film thickness of the infrared cutoff film on the lower portion 1c of the glass plate 1 is approximately 1400 nm or greater. The greatest film thickness of the infrared cutoff film on the lower portion 1c of the glass plate 1 is equal to or greater than three times the smallest film thickness of the infrared cutoff film on the upper portion 1b of the glass plate 1.

The 1550-nm wavelength light transmittance of the glass plate 1 at the lower portion 1c where the film thickness is the greatest is equal to or smaller than 50% of the 1550-nm wavelength light transmittance of the glass plate 1 at the upper portion 1b where the film thickness is the smallest.

Figure 4:
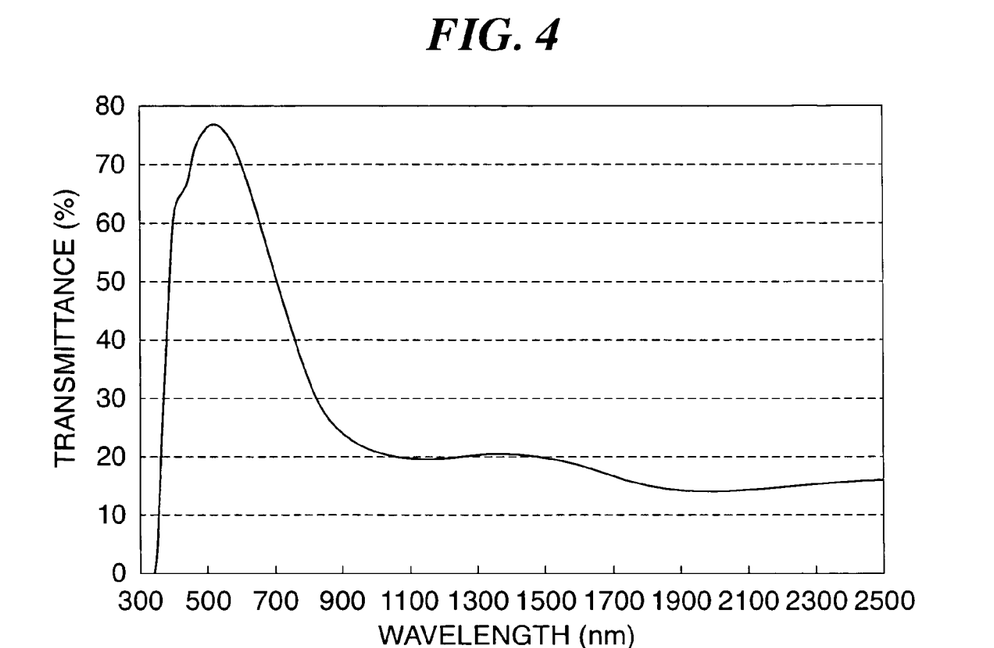
FIG. 4 is a view showing the optical transmittance for light with wavelengths of 300 nm to 2500 nm at the upper portion of the glass plate.
Figure 5:
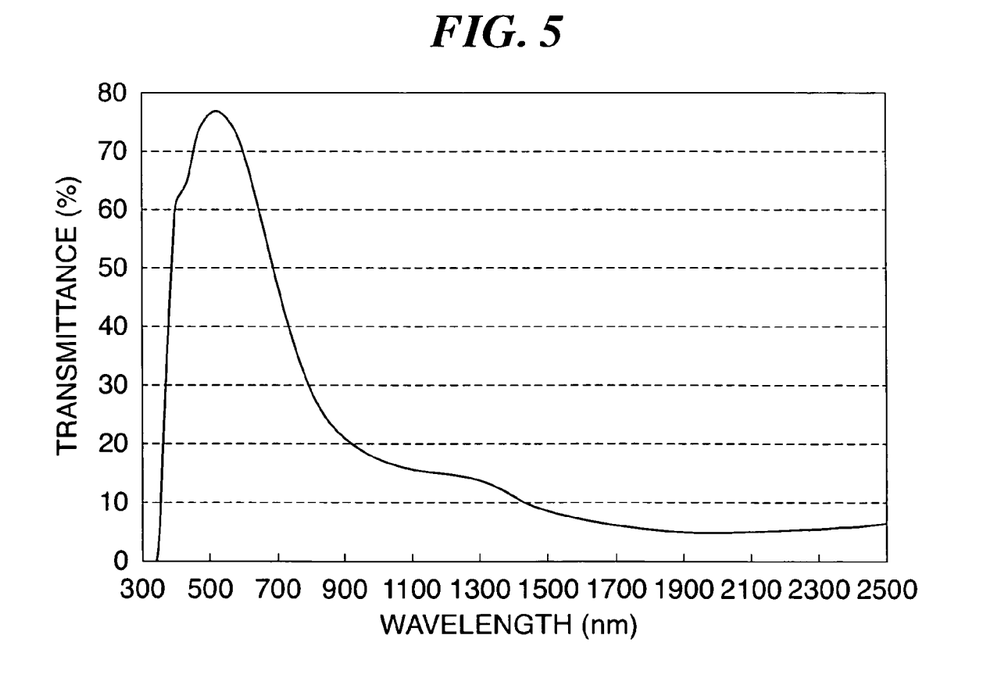
FIG. 5 is a view showing the optical transmittance for light with wavelengths of 300 nm to 2500 nm at the lower portion of the glass plate.

The optical transmittance values for light with wavelengths of 300 to 2500 nm at the upper portion 1b and lower portion 1c of the glass plate 1 on which the infrared cutoff film is formed according to the example 1 were measured with the spectrophotometer (Model: UV-3100PC: Shimadzu Corporation). FIGS. 4 and 5 show the measurement results. FIG. 4 is a view showing the optical transmittance for light with wavelengths of 300 to 2500 nm at the upper portion 1b of the glass plate 1. FIG. 5 is a view showing the optical transmittance for light with wavelengths of 300 to 2500 nm at the lower portion 1c of the glass plate 1.

In FIGS. 4 and 5, the upper portion 1b of the glass plate 1 where the film thickness is the smallest has an optical transmittance of 30% or lower for light with wavelengths of 1000 to 1600 nm and an optical transmittance of 20% or lower for light with wavelengths of 1600 to 2500 nm, and the lower portion 1c of the glass plate 1 where the film thickness is the greatest has an optical transmittance of 20% or lower for light with wavelengths of 1000 to 1600 nm and an optical transmittance of 10% or lower for light with wavelengths of 1600 to 2500 nm.

The glass plates 1 of the example 1 and the comparative example 1 were installed in the door portion of the vehicle 5. The vehicle 5 was disposed in such a way that sunlight impinges straight on the door portion of the vehicle 5 in which the glass plates 1 of the example 1 and the comparative example 1 were installed. Passengers were seated on the seats close to the door portion of the vehicle 5 in which the glass plates 1 of the example 1 and the comparative example 1 were installed. The angle between the sunlight that entered the vehicle and the horizontal plane was set to 60 degrees, and burning sensations of the skin of the passenger when the sunlight impinged on the passenger for five minutes were compared between the glass plates 1 of the examples 1 and the comparative example 1. Table 3 shows the comparison results.

TABLE 3

| | Method for applying infrared cutoff liquid | Burning sensation |
|---|---|---|
| Example 1 | Lower portion when installed in vehicle is up | No |
| Comparative example 1 | Upper portion when installed in vehicle is up | Slightly yes |

Since most of the sunlight impinging on the passenger was the light passing through the glass plate 1 on the upper side of the vehicle 5, the burning sensation of the skin of the passenger passing through the glass plates 1 of the example 1 having higher infrared cutoff effects of the glass plate 1 on the upper side of the vehicle 5, was reduced as compared to the glass plate 1 of the comparative example 1.

According to the above embodiments, since the film thickness of the infrared cutoff film on the upper side of the vehicle 5 is greater than the film thickness of the infrared cutoff film on the lower side of the vehicle 5, the infrared light cutoff effect of the upper portion of the vehicle 5 where direct infrared rays likely impinge on passenger can be enhanced. Thus, the manufacturing cost can be reduced and burning sensation of the skin of the passenger in the vehicle can be reduced.

The invention claimed is:
1. A window pane for an automobile, the window pane comprising:
 a single sheet of glass plate; and
 an infrared cutoff film formed on the single sheet of glass plate;
 wherein a film thickness of the infrared cutoff film on an upper portion of the window pane is greater than the film thickness on a lower portion of the window pane when the window pane is installed in the automobile, and wherein a variation from a minimum value in the film thickness on the lower portion to a maximum value in the film thickness on the upper portion is at least 1000 nm per 600 mm in a vertical direction of the window pane when installed in the automobile.

2. The window pane according to claim 1, wherein the infrared cutoff film contains a silica component and an infrared cutoff component.

3. The window pane according to claim 1, wherein an infrared cutoff component included in the infrared cutoff film is at least one selected from the group consisting of tin-doped indium oxide (ITO) fine particles, antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, lanthanum hexaboride fine particles, and cerium hexaboride fine particles.

4. The window pane according to claim 1, wherein an infrared cutoff component included in the infrared cutoff film is 20 to 45 mass % of a total mass of the infrared cutoff film.

5. The window pane according to claim 1, wherein the film thickness continuously varies from the upper portion to the lower portion.

6. The window pane according to claim 1, wherein a greatest film thickness of the infrared cutoff film on the upper portion is equal to or greater than twice a smallest film thickness of the infrared cutoff film on the lower portion.

7. The window pane according to claim 1, wherein the infrared cutoff film on the lower portion where the film thickness is smallest has an optical transmittance of 30% or lower for light with wavelengths of 1000 to 1600 nm and an optical transmittance of 20% or lower for light with wavelengths of 1600 to 2500 nm, and the infrared cutoff film on the upper portion where the film thickness is greatest has an optical transmittance of 20% or lower for light with wavelengths of 1000 to 1600 nm and an optical transmittance of 10% or lower for light with wavelengths of 1600 to 2500 nm.

8. The window pane according to claim 1, wherein a 1550-nm wavelength light transmittance of the infrared cutoff film on the upper portion where the film thickness is greatest is equal to or smaller than 50% of the 1550-nm wavelength light transmittance of the infrared cutoff film on the lower portion where the film thickness is smallest.

9. A manufacturing method for the window pane according to claim 1, the method comprising:
    forming the infrared cutoff film on a surface of the sheet of glass plate by using a flow coating method; and
    installing the window pane in the automobile such that the film thickness of the infrared cutoff film on the upper portion of the window pane is greater than the film thickness on the lower portion of the window pane.

* * * * *